Oct. 31, 1961     E. T. YOUNG     3,006,504
PRESELECTING MECHANISM FOR FLUID DISPENSING APPARATUS
Filed Aug. 27, 1958     5 Sheets-Sheet 1

INVENTOR.
EINAR T. YOUNG
BY Roberto. Spindle
ATTORNEY

Fig. 3

Oct. 31, 1961     E. T. YOUNG     3,006,504
PRESELECTING MECHANISM FOR FLUID DISPENSING APPARATUS
Filed Aug. 27, 1958     5 Sheets-Sheet 3

INVENTOR.
EINAR T. YOUNG
BY
Roberto. Spindle
ATTORNEY

INVENTOR.
EINAR T. YOUNG

United States Patent Office 3,006,504
Patented Oct. 31, 1961

3,006,504
PRESELECTING MECHANISM FOR FLUID
DISPENSING APPARATUS
Einar T. Young, Newtown Square, Pa., assignor to Sun
Oil Company, Philadelphia, Pa., a corporation of New
Jersey
Filed Aug. 27, 1958, Ser. No. 757,578
17 Claims. (Cl. 222—15)

This invention relates to a preselecting mechanism, and more particularly to a preselecting mechanism applicable to fluid dispensing apparatus, for causing a preselected or preset quantity of fluid to be dispensed, in an automatic manner. In other words, the mechanism of this invention automatically stops the dispensing of fluid from the apparatus after the desired (preset) quantity of fluid has been dispensed.

The preselecting mechanism of this invention is particularly useful for gasoline pumps of the dispensing type, as commonly used in automobile service stations. For some time past, such dispensing pumps have been provided with automatic nozzles which during the dispensing operation automatically cut off the flow of gasoline at the nozzle when the customer's gasoline tank becomes full. Such nozzles are timesaving devices in that they allow the pump attendant to perform other servicing of the customer's automobile during the filling of the gasoline tank.

However, such automatic nozzles take care of only the tank fill-up transactions, which account for less than one-half of the total individual transactions. It is therefore highly desirable to provide gasoline dispensing pumps with a presettable control mechanism arranged to automatically stop the dispensing of gasoline after a preset quantity (measured in either volume or cost) of gasoline has been dispensed. The addition of such a preselecting mechanism to a dispensing gasoline pump saves additional time, in that the pump attendant may perform other servicing of the automobile even during the transactions involving specific predetermined quantities of gasoline, measured in either volume (gallons) or cost (dollars). Thus, when a pump which is already provided with an automatic shutoff nozzle is additionally provided with a preselecting mechanism, the pump is rendered fully automatic.

An object of this invention is to provide an improved preselecting mechanism for fluid dispensing apparatus.

Another object is to provide a preselecting mechanism for gasoline dispensing pumps which, as compared to prior mechanisms, is substantially simpler, both in its mechanical construction and in its mode of control by the attendant for the actual preselection.

The objects of this invention are accomplished, briefly, in the following manner. The preselecting mechanism of this invention operates in conjunction with a counter or register of more or less conventional type, having a set (usually three) of volume wheels and a set (usually three) of cost wheels, the volume wheels being driven directly from a meter through which is passed the fluid dispensed and the cost wheels being driven from the meter through a variator which changes the speed of rotation of the latter wheels in accordance with the price per gallon of the fluid dispensed. One of the cost wheels, by means of suitable gearing, drives a rotatable actuating member, while a similar rotatable actuating member is driven from the volume portion of the counter. A separate actuated member or lever is arranged to be operated by each respective actuating member, these levers both being connected by means of a mechanical linkage to an actuating means which controls a valve in the fluid conduit. The arrangement is such that whichever one of the levers is operative during a particular dispensing operation (they are never both operative simultaneously) is actuated in response to the reaching by its corresponding actuating member (during the automatic rotation of the latter by the counter, during dispensing) of a predetermined angular position. This actuation of the operative lever serves to close the valve in the fluid conduit.

The manual rotation of a single control handle, through suitable gearing, causes rotation of both of the rotatable actuating members to an angular setting corresponding to a desired or predetermined quantity of fluid to be dispensed. By means of camming surfaces driven from this last-mentioned gearing, a first one of the two levers is held in an inoperative position with respect to its actuating member during 180° of angular movement of the control handle, the second lever being in an operative position with respect to its actuating member during this 180° of movement, and the second lever is held in an inoperative position with respect to its actuating member during the other 180° of angular movement of the control handle, the first lever being in an operative position with respect to its actuating member during this latter 180° of movement. In a zero position of the control handle, both of the levers are held in inoperative positions with respect to their respective actuating members, this being the "fill-up" position of the fluid dispensing apparatus, wherein the preselecting mechanism of the invention is inoperative and wherein the conventional automatic shut-off nozzle takes over the control of the dispensing operation.

By means of a suitable mechanical linkage operated from the gasoline pump control handle, the operation of this handle to its "on" position is made to lock the gearing operated by the "preselector" handle, so as to prevent accidental rotation thereof while the pump is on. The linkage unlocks this same gearing, and further operates to move both of the levers to their inoperative positions (with respect to their respective actuating members), in response to the operation of the pump control handle to its "off" position. This unlocking action permits a new preselection to be made, and also allows proper resetting of the actuating members along with the resetting of the counter wheels to zero.

Finally, resetting of the actuating members to their proper "zero" positions (that is, to the positions they should have prior to the start of a dispensing operation utilizing the preselecting mechanism) is accomplished through the same gearing which effects driving of these actuating members from the counter during the dispensing operation, and this resetting of the actuating members is effected simultaneously with the resetting of the counter wheels to zero.

A detailed description of the invention follows, taken in conjunction with the accompanying drawings, wherein.

By way of example, the preselecting mechanism of this invention may be employed in conjunction with the register or counter described in Bliss Patent No. 2,814,444, issued November 26, 1957, and it will be so described although it is pointed out that the preselecting mechanism to be described is readily adaptable to other types of counters or registers.

Figures 1, 2:
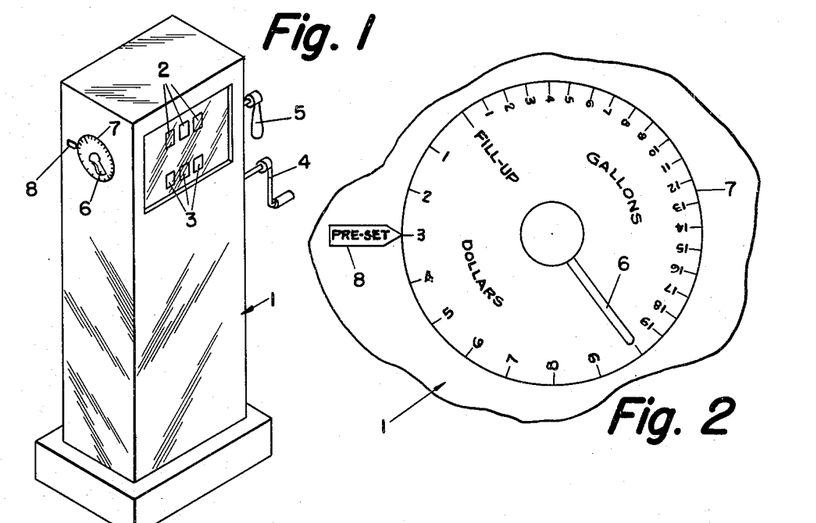
FIGURE 1 is a perspective view of a fluid dispensing apparatus embodying this invention, showing schematically various control handles.
FIGURE 2 is a view on an enlarged scale of the dial associated with the preselecting mechanism of this invention.
Figure 10:
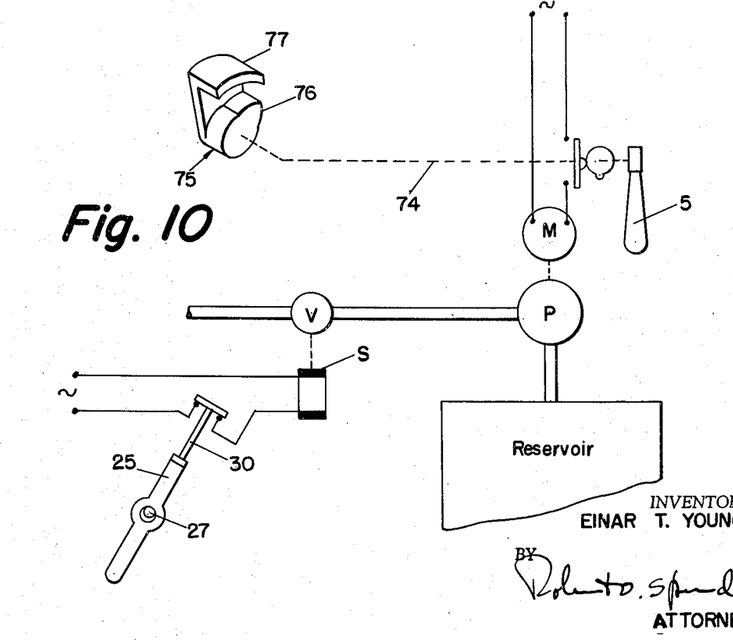
FIGURE 10 is a combined mechanical and electrical diagram illustrating schematically the fluid dispensing system with which the preselecting mechanism of the invention is adapted to be used.

Referring first to FIGS. 1 and 10, a gasoline dispensing pump, indicated generally by the numeral 1, comprises a generally box-like housing containing a register of the type referred to, with which register is associated the preselecting mechanism of this invention. The dispensing pump also includes a pump P, for pumping gasoline from a reservoir or storage tank through a conduit and out through a dispensing hose (not shown) to a nozzle (not shown). A valve V is provided in the conduit, this valve being adapted to be controlled by the preselecting mechanism of this invention, as will become apparent hereinafter.

The register or counter has a set of three volume wheels and a set of three cost wheels, the volume wheels being driven directly from a meter through which is passed the gasoline dispensed and the cost wheels being driven from the meter through a variator which changes the speed of rotation of the latter wheels in accordance with the price per gallon of the fluid dispensed. The housing has an upper row of windows 2 situated in registry with the cost wheels of the register so as to expose the reading line thereof to view, and a lower row of windows 3 situated in registry with the volume wheels, to similarly expose the volume wheels to view. Although not shown in FIG. 1, it will be understood that the housing has similar rows of windows at the opposite side for cooperation with another set of cost wheels and volume wheels of the counter. Also, it will be understood that number wheels, indicating the price per gallon of the fluid being dispensed, are generally provided, along with windows exposing such latter wheels to view. These number wheels are associated with the variator mechanism, the variator being set in accordance with the price per gallon to produce the proper speed ratio between the drives to the cost wheels and volume wheels.

A reset handle 4, for resetting the counter wheels to zero, is provided externally of the pump housing, and a control handle 5, for turning the pump motor on and off, is also provided externally of the housing.

The preselecting mechanism of this invention is manually controlled or positioned, to preselect or preset a desired quantity of fluid such as gasoline to be dispensed, by means of a preselector control handle 6. This latter handle is illustrated as being at the opposite side of the pump housing from handles 4 and 5. Control handle 6 is secured to a circular dial 7 having suitable indicia thereon around its periphery, these indicia cooperating with a fixed index marker 8 (secured to the pump housing), which index may be labeled "Pre-Set." Handle 6 and dial 7 are rotatable with respect to the pump housing, as will become apparent hereinafter, and by means of handle 6 the dial 7 secured thereto may be rotated so that a selected one of the indicia or calibration marks thereon may be positioned opposite index 8. As illustrated in FIG. 2, separate "Gallons" and "Dollars" indicia are provided on dial 7, with an index mark labeled "Fill-Up" also located thereon between the "Gallons" and "Dollars" indicia, at a position corresponding to zero gallons and zero dollars. The "Gallons" indicia may for example be labeled with the numerals 1 to 19 inclusive, spaced equally around a little less than one-half of the circumference of dial 7, these numbers increasing in a clockwise direction around the dial. The "Dollars" indicia may for example be labeled with the numerals 1 to 9 inclusive, spaced equally around a little less than the remaining one-half of the circumference of dial 7, these numbers increasing in a counter-clockwise direction around the dial. Taking into account the "Fill-Up" position of the dial and the position diametrically opposite such position, it may be seen that there are twenty equal spaces in the "Gallons" part of the dial and ten equal spaces in the "Dollars" part of the dial; thus, the angles subtended between adjacent marks on the "Gallons" portion of the dial are exactly half as large as those subtended between adjacent marks on the "Dollars" portion of the dial.

Figure 3:
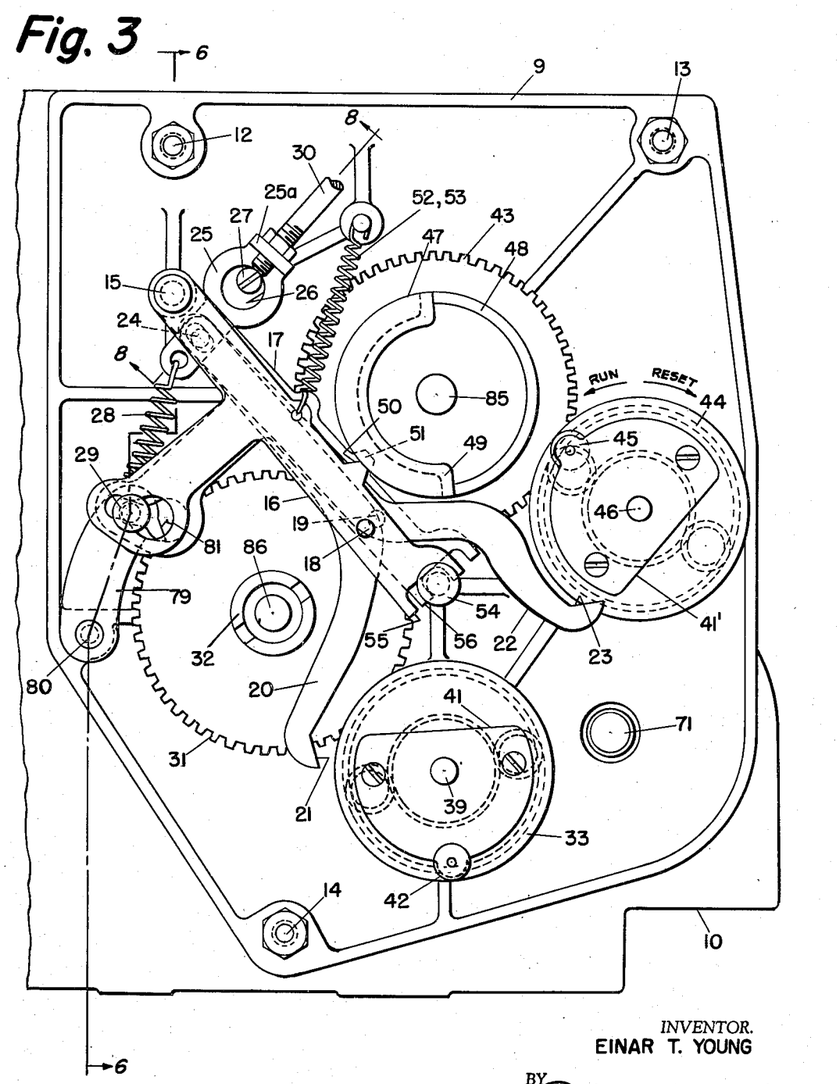
FIGURE 3 is a front elevation of the preselecting mechanism, the parts being shown in their positions for a "dollars" preselection.
Figures 4, 9, 9A:
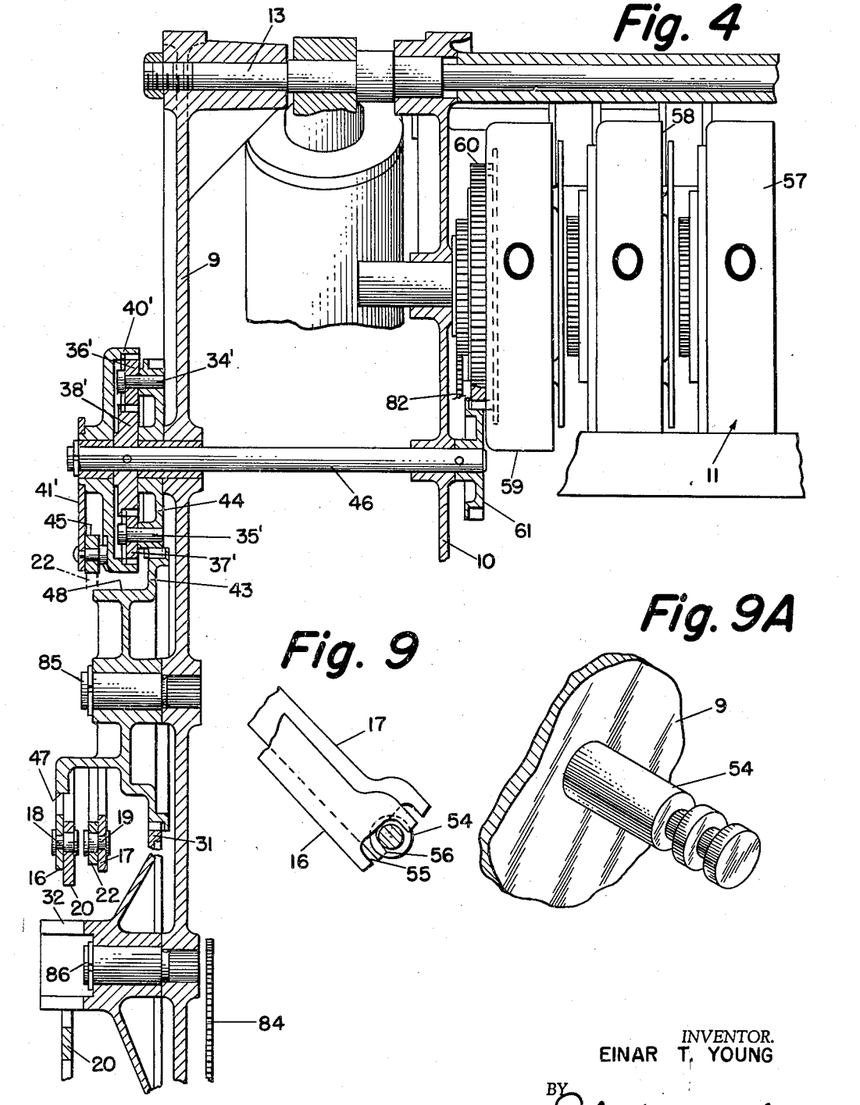
FIGURES 4 and 5 together constitute a sectional view through the preselecting mechanism, showing the relationship of this mechanism to parts of the counter.
FIGURES 9 and 9A are partial views showing details, FIGURE 9 showing the lower ends of the two arms and FIGURE 9A showing the pin adapted to engage the lower ends of the two arms.
Figure 5:
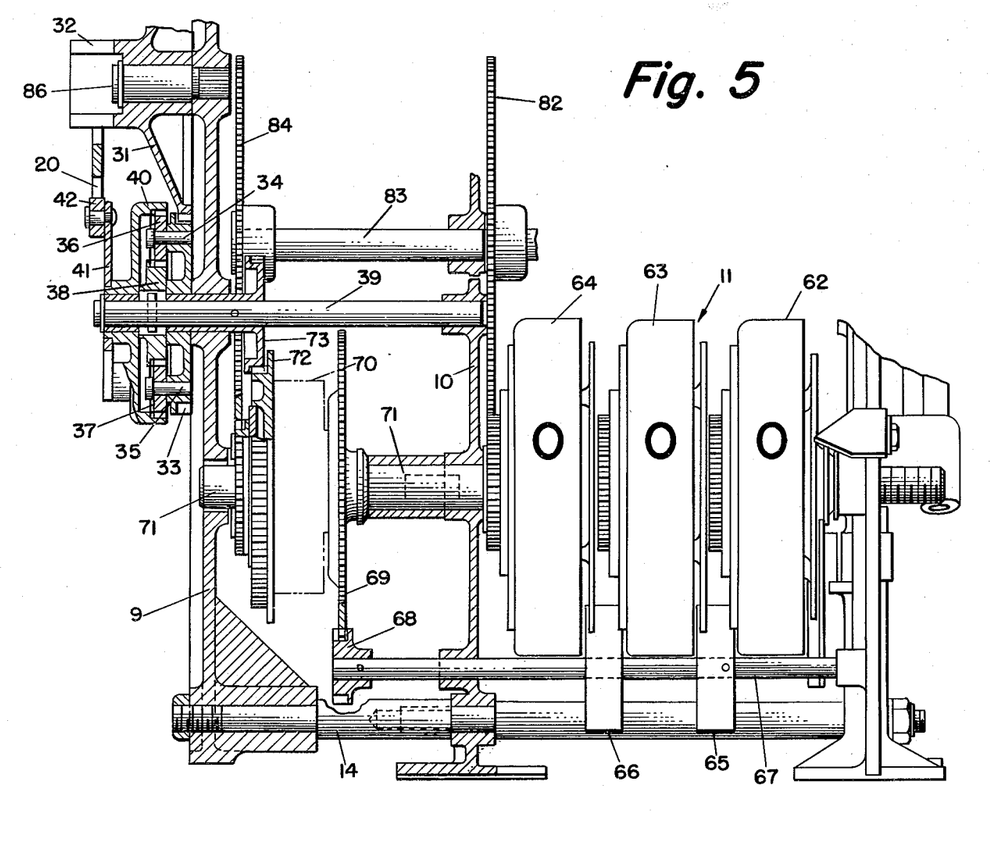

Now referring to FIGS. 3–9, which disclose the details of the preselecting mechanism of this invention, and particularly to FIG. 3, the preselecting mechanism is generally mounted on and supported by a base member 9, which may for example be a casting and which is more or less rectangular in outline. This base member is secured to one of the side plates 10 of a counter or register 11, but spaced from such side plate, by extensions of three of the spreader bars or bolts which normally hold the two side plates of the register in spaced-apart relationship, to form a frame for such register. These three extended spreader bars are denoted by numerals 12, 13 and 14, and are rigidly fastened to both the base member 9 and the counter side plate 10.

In this connection, it is desired to be pointed out that there will be described herein only so much of the structure of the counter as is necessary for an understanding of the present invention. For additional details of the counter, reference should be made to the Bliss patent identified above.

A pin 15 is firmly secured to base member 9 to project outwardly therefrom. Two more or less T-shaped arms 16 and 17 are pivotally mounted on pin 15 in spaced-apart relation, arm 16 being toward the front or nearest the reader in FIG. 3 and arm 17 being in back of arm 16. The pin 15 is located at one end of the cross member of each of the T-arms 16 and 17. A fulcrum pin 18 is secured to arm 16 near that end of the cross member thereof which is remote from pin 15. A similar fulcrum pin 19 is secured to arm 17 near that end of the cross member thereof which is remote from pin 15.

An elongated lever 20 is mounted on fulcrum pin 18 in such a way that pin 18 both supports this lever and serves as a fulcrum for the lever. On one side of fulcrum pin 18, lever 20 extends more or less parallel to the cross member of arm 16, but on the other side of this fulcrum pin the lever 20 extends downwardly away from the cross member of arm 16, that is, in a direction transverse to such cross member. At the end of this transversely-extending portion of lever 20, such lever is provided with an inclined or wedge-like camming surface 21, for a purpose to be hereinafter described. Lever 20 is preferably mounted just in back (referring to FIG. 3) of arm 16.

An elongated lever 22 is mounted on fulcrum pin 19 in such a way that pin 19 both supports this lever and serves as a fulcrum for the lever. On one side of fulcrum pin 19, lever 22 extends more or less parallel to the cross member of arm 17, but on the other side of this fulcrum pin the lever 22 extends upwardly away from the cross member of arm 17, that is, in a direction transverse to such cross member. At the end of this transversely-extending portion of lever 22, such lever is provided with an inclined or wedge-like camming surface 23, for a purpose to be hereinafter described. Lever 22 is preferably mounted just in front (referring to FIG. 3) of arm 17.

A pivot pin 24 (see in particular FIG. 8) is rigidly secured to the left or upper ends of both of the levers 20 and 22, this pin having a construction such as to secure the ends of these levers in spaced-apart relation. One end of a connecting member 25 is pivotally mounted on pin 24, between the levers 20 and 22, this latter member extending generally upwardly and to the right in FIG. 3. Intermediate its ends, member 25 has an enlarged aperture 26 into which extends a stop pin 27 whose diameter is considerably smaller than that of aperture 26, as particularly illustrated in FIG. 8. Pin 27 is rigidly secured to base member 9, and extends outwardly therefrom, or toward the reader in FIG. 3. A spring 28, fastened at one end to the lower end of member 25 and at its opposite end to a pin 29 to be further referred to hereinafter, urges member 25 downwardly against stop pin 27, so that the upper edge of aperture 26 engages pin 27. As will be explained hereinafter, pin 29 is stationary during a dispensing operation, so that for the purposes of the present discussion this pin may be considered as the fixed lower fastening point for spring 28.

The upper end of member 25 extends forwardly (in FIG. 3) as at 25a, and this forwardly-extending portion 25a has a tapped or threaded aperture therein, which mates with the threaded lower end of a link member 30 extending generally parallel to the longitudinal direction of member 25. The threaded connection between link 30 and member 25 allows longitudinal adjustment of this link with respect to member 25.

The gasoline dispensing pump 1 with which the preselecting mechanism of this invention is adapted to be used has an automatically-actuated valve V (see FIG. 10) in the conduit leading from the pump P to the dispensing hose. This valve, by way of example only, may be operated by means of a solenoid S, although it might be mechanically operated in some cases. If the valve is operated by means of a solenoid, it will be held open when the solenoid is energized, and closed by a spring when the solenoid is deenergized. The upper end of link member 30 is directly mechanically connected to a suitable switch which controls the energization and deenergization of the valve solenoid S, the arrangement here being such that the switch is opened, thus deenergizing the valve solenoid and closing the valve, by an upward movement of link 30. The closing of the valve in the gasoline conduit stops the dispensing of fluid (gasoline) from the dispensing apparatus, assuming of course that the pump has been started and dispensing has been going on. Conversely, the switch is closed, energizing the valve solenoid and opening the valve, by a downward movement of link 30. It may thus be seen, once dispensing is in progress, that an upward movement of link 30 causes closing of the valve and stops the dispensing of fluid from the apparatus.

The preset or preselecting control handle 6 operates a shaft (not shown) inside the housing of the gasoline dispensing pump 1. This shaft has associated therewith a suitable detenting mechanism, in order to facilitate the proper positioning of the indicia on dial 7 with respect to index 8. This detenting mechanism is of quite conconventional construction and therefore has not been shown. In this connection, it should be remembered that the teeth of the detenting mechanism should be unequally spaced for the two 180° sectors of dial 7, since the "Gallons" indicia are only half as far apart on dial 7 as the "Dollars" indicia.

The shaft just described, which is manually rotated by means of handle 6, is, in the normal assembled position of the device, caused to rotate a gear wheel 31, by means of a coupling 32 keyed to such shaft and rigidly secured to wheel 31. Gear wheel 31 is journaled on a shaft 86 which is fixed in base member 9, and this gear wheel has a number of teeth such that there is a tooth space corresponding to each gallon and dollar setting of handle 6 (and dial 7).

During the actual dispensing operation, when the gasoline pump is turned on, wheel 31 is locked against rotation, but when the pump is turned off this wheel is unlocked and is free to rotate. How this locking and unlocking is brought about will be described hereinafter in more detail, but for the present it will be assumed that gear wheel 31 is unlocked, so the description can proceed. The teeth in gear wheel 31 mesh with the teeth on a gear wheel 33 which is journaled for rotation about an axis parallel to that of wheel 31. Gear wheel 33 has secured thereto, extending forwardly therefrom in FIG. 3, a pair of diametrically-opposite pins 34 and 35. A separate planet gear is carried by each respective one of the pins 34 and 35, each planet gear being free to rotate about its respective pin. Thus, planet gear 36 is carried by pin 34, and planet gear 37 is carried by pin 35. The teeth of planet gears 36 and 37 mesh with the teeth of a sun gear 38, in the form of a gear wheel keyed or pinned to a shaft 39 which is driven from the counter 11 during a dispensing operation, in a manner to be described hereinafter.

For the present, assuming a dispensing operation has been completed, it will be assumed that shaft 39 and sun gear 38 are stationary, although it is possible for shaft 39 to rotate, during a resetting operation, simultaneously with gear wheels 31 and 33. However, the latter is an unusual situation, and shaft 39 (and sun gear 38), on the one hand, and gear wheels 31 and 33, on the other hand, do not normally rotate at the same time.

Gear wheel 33 is concentric with shaft 39 and is carried on the outside of a bushing fixed to base 9. Shaft 39 is in turn journaled for rotation inside this same bushing and also in the counter side plate 10.

The teeth of planet gears 36 and 37 also mesh with the internal teeth of a ring gear 40 which is carried by shaft 39 and is arranged for free rotation with respect thereto. This arrangement of sun gear 38, planet gears 36 and 37, and ring gear 40 together constitutes a differential, or an epicyclic gear train. In response to the rotation of gear wheel 31 by means of handle 6, gear 33 rotates and carries around with it the pins 34 and 35, thus moving the planet gears 36 and 37 to a new position. This revolution of the planet gears causes the ring gear 40 to rotate. The foregoing has assumed that the sun gear 38 was remaining stationary while the planet gears were being moved around to a new position by gear 33. However, even if the sun gear and the planet gears were rotating simultaneously, the ring gear 40 would rotate, although in this case, of course, a differential rotation of the ring gear would be produced.

A plate 41 (which does not need to be a completely circular disc, although it may be) is securely fastened to ring gear 40, to be driven thereby. A pin is secured to the circular periphery of plate 41, and this pin carries a roller 42 (the "gallons" roller) of small diameter, which extends radially outwardly a small distance beyond the circumferential edge of plate 41. Roller 42 is mounted in front of plate 41. As may be seen in FIG. 5, the relation of the parts is such that roller 42 is aligned, front to rear, with lever 20, so that when this lever is in an operative position with respect to plate 41 and roller 42, this roller can engage the camming surface 21 of lever 20.

Summarizing the above action, the manual rotation of handle 6, through the differential gearing described, causes the rotation of ring gear 40, plate 41, and roller 42 to an angular position dependent upon the rotation of such handle. It is assumed, for the purposes of the above description, that lever 20 is in an inoperative position with respect to roller 42, so that the lever does not interfere with the rotation of the plate and roller.

The teeth on gear wheel 31 also mesh with the teeth on a gear wheel 43 which is journaled for rotation about a stub shaft 85 secured to base member 9 and having an axis parallel to that of wheel 31. The teeth on gear wheel 43 in turn mesh with the teeth on a gear wheel 44 journaled for rotation about an axis parallel to that of wheels 31 and 43.

A mechanical arrangement very similar to that previously described in connection with "gallons" roller 42 is used for driving a "dollars" roller 45 which rotates about the same axis as wheel 44. Parts similar to those previously described are denoted by the same reference numerals, but carrying prime designations. For conciseness, the description of the mechanical arrangement will not be repeated, except to point out the differences.

Sun gear 38' is keyed or pinned to a shaft 46 which is driven from the counter 11 during a dispensing operation. Gear wheel 44 is concentric with shaft 46 and is carried on the outside of a bushing fixed to base 9. Shaft 46 is journaled for rotation inside this same bushing and also in counter side plate 10. Ring gear 40' is also carried by shaft 46 and is arranged for free rotation with respect thereto.

Plate 41' carries the "dollars" roller 45. Roller 45 is mounted just in back of plate 41'. The relation of the parts is such that roller 45 is aligned, front to rear, with lever 22, so that when this lever is in an operative position with respect to plate 41' and roller 45, this roller can engage the camming surface 23 of lever 22.

Figures 6, 7, 8:
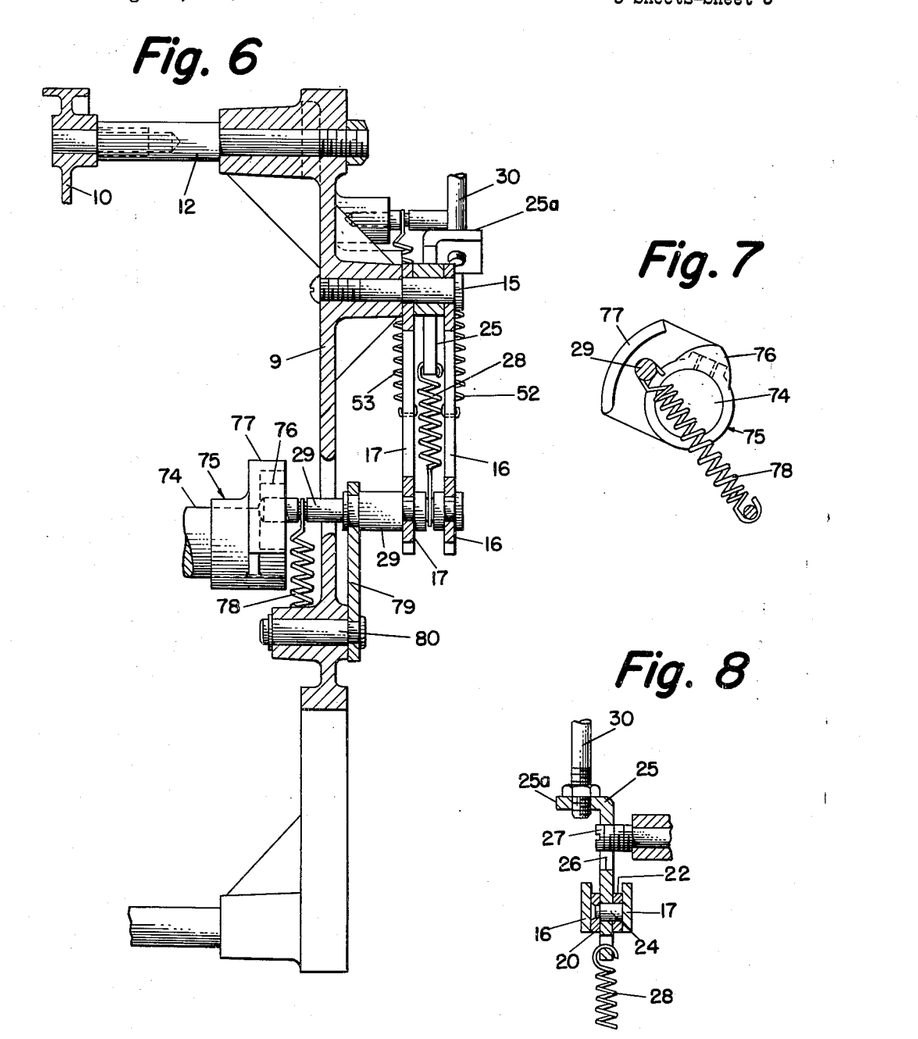
FIGURE 6 is a section taken along line 6—6 of FIGURE 3, looking in the direction of the arrows.
FIGURE 7 is a detailed sectional view of a portion of FIGURE 6 showing the cam and the pin serving as a cam follower.
FIGURE 8 is a section taken along line 8—8 of FIGURE 3, looking in the direction of the arrows.

It may be seen that the manual rotation of handle 6 causes the simultaneous rotation of ring gears 40 and 40', plates 41 and 41', and rollers 42 and 45 to an angular position dependent upon the amount of rotation of such handle. It is again assumed, for the purposes of this description, that lever 22 is in an inoperative position with respect to roller 45, so that this lever does not interfere with the rotation of plate 41'. It may be noted that, due to the interposition of gear 43 between gears 31 and 44, rollers 42 and 45 will be caused to rotate in opposite directions, for any particular direction of rotation of handle 6. This corresponds to the opposite directions of increase of the "Gallons" and "Dollars" indicia on dial 7.

Two cam elements 47 and 48 are rigidly secured to gear wheel 43, concentrically thereof, for rotation therewith, these cam elements being positioned in spaced relation along the axis of rotation of wheel 43. The front cam element 47 is aligned, front to rear, with the front T-arm 16, and the rear cam element 48 is aligned, front to rear, with the rear T-arm 17. Each of these cam elements comprises a raised camming portion extending over substantially 180° of the circumference of the wheel 43, the camming portions of the two elements extending over respective opposite 180° portions of the total circumference of this wheel. The intersection of these two camming portions is indicated at 49, it being assumed that the two cam elements are formed from a single piece of metal, such as a die casting. For purposes of symmetry and strength, there will be another cam intersection at a point diametrically opposite 49, but this second intersection is not made use of.

Each of the arms 16 and 17 has an outwardly extending lug located at a point approximately two-thirds of the way along the length of the respective cross member, from pivot pin 15. These lugs are adapted to cooperate with the raised camming portions of the respective cam elements 47 and 48. Lug 50 on the front arm 16 cooperates with the raised portion of cam element 47, and also with the cam intersection 49. Lug 51 on the rear arm 17 cooperates with the raised portion of cam element 48, and also with the cam intersection 49. A spring 52 has one end fastened about midway along the cross member of arm 16 and its other end fastened to a pin fixed to base member 9; this spring urges arm 16 upward to keep lug 50 against the camming surface of element 47. A spring 53 has one end fastened about midway along the cross member of arm 17 and its other end fastened to the same fixed pin as does spring 52; spring 53 urges arm 17 upward to keep lug 51 against the camming surface of element 48. Springs 52 and 53 are considerably stronger than spring 28.

A stop pin 54 is rigidly secured to base member 9 and extends outwardly therefrom, in a position to limit the rotary movement of the outer ends of T-arms 16 and 17, under certain conditions. The outer end of arm 16 (that is, the end of the cross member of this arm opposite the pin 15) is bifurcated to provide a yoke, the lower fork of this yoke being indicated at 55. This lower fork is adapted to contact stop pin 54, thereby to limit the upward movement of arm 16 and to very accurately position the free end of this arm, under certain conditions. Preferably, the portion of the end of arm 16 between the forks slides in a circumferential groove in pin 54, preventing in-and-out (in FIG. 3) movement of the free end of arm 16. Likewise, the outer end of arm 17 (that is, the end of the cross member of this arm opposite the pin 15) is bifurcated to provide a yoke, the lower fork of this yoke being indicated at 56. This lower fork is adapted to contact stop pin 54, thereby to limit the upward movement of arm 17 and to very accurately position the free end of this arm, under certain conditions. Preferably, the portion of the end of arm 17 between the forks slides in a circumferential groove in pin 54, preventing in-and-out movement of the free end of arm 17.

The camming portions of elements 47 and 48 hold lugs 50 or 51 downward, depending on whether the dial 7 is set to "Dollars" or "Gallons." As FIG. 3 is drawn, the setting is on three dollars. The camming portion of element 47 is holding lug 50, and therefore also arm 16, in its lower or inoperative position. Fulcrum pin 18 (which is attached to arm 16) is also in its lower position. Since connecting member 25 is urged by spring 28 against stop pin 27, pin 24 (which couples levers 20 and 22 to member 25) is fixed temporarily in position. This fixes in the same position the left end of levers 20 and 22. Since the fulcrum (pin 18) of lever 20 is held down by lug 50, and the left end of lever 20 is fixed, the camming surface 21 is held in a downward or inoperative position with respect to roller 42. Spring 52 urges arm 16 upward to keep lug 50 against the camming portion of element 47.

Arm 17 is urged upward by spring 53. Since lug 51 is free of any cam surface (the raised camming portion of element 48 is now turned to an inoperative position with respect to this lug), arm 17 is free to move upward, and it will move until fork 56 engages stop 54. In this position of arm 17, fulcrum pin 19 is fixed very accurately, and with the left end of lever 22 fixed temporarily, camming surface 23 is held in an accurate, operative position with respect to roller 45, to be engaged by said roller when the latter swings around. How roller 45 is made to swing around during a dispensing operation will be described hereinafter.

Presetting of the mechanism to a different dollar value is done as follows: It is again assumed, for the present purposes, that gear wheel 31 is free to rotate, and that levers 20 and 22 are held in an inoperative position with respect to their respective rollers 42 and 45. By means of the preset control handle 6, gear wheel 31 is rotated to the desired number of "Dollars," as indicated on dial 7. Gear 31 rotates gears 33, 43, and 44. Gear 43 rotates cam elements 47 and 48, but in the "Dollars" region the camming portions of these elements do not change in their effect on lugs 50 and 51. The epicyclic gear trains 36', 40', etc. acts to move ring gear 40', plate 41', and roller 45 around to a new position.

During the presetting operation described, roller 42 will be rotated to a new position by gear 33, through the differential gearing 36, 40. However, since during the "Dollars" dispensing operation lever 20 is held in the inoperative position by cam element 47 acting on lug 50, the position of roller 42 has no effect.

Presetting of the mechanism to a "Gallons" value is done as follows: Again assume that the various parts are disengaged or unlocked. Wheel 31 is then unlocked or free to rotate, and levers 20 and 22 are held in inoperative positions with respect to their rollers 42 and 45, respectively. Coupling 32 and gear wheel 31 are rotated counterclockwise to some "Gallons" setting indicated on dial 7, by means of control handle 6. This operation will cause the rotation of roller 42 to the proper angular position, by means of the gearing previously described. Likewise, the rotation of gear wheel 33 will cause the cam intersection 49 to pass to the left side of lugs 50 and 51. Then, during the dispensing operation, the camming portion of cam element 48 will hold lug 51 down, holding arm 17 and lever 22 downward and keeping camming surface 23 in the inoperative position with respect to roller 45. Now, the camming portion of cam element 47 will be out of its active position with respect to lug 50. So, arm 16 and lever 20 will be drawn upward by spring 52, moving until fork 55 engages stop 54. Now, camming surface 21 is held in an accurate, operative position with respect to roller 42, to be engaged by said roller when the latter swings around. How roller 42 is made to swing around, during a dispensing operation, will be described hereinafter.

The three cost wheels of the counter 11 comprise a cents wheel 57, a tens wheel 58, and a dollars wheel 59. The figures are drawn to indicate all counter wheels at zero, and the preset mechanism at a setting of three dollars. As the dispensing of gasoline is started, cents wheel 57 will rotate, being driven from the output shaft of a variator, which latter unit is in turn driven from the meter through which is passed the gasoline dispensed and which is rotated thereby in an amount commensurate with the volume of gasoline dispensed. A transfer mechanism (not shown), comprising a transfer pinion driven by a type of Geneva movement from the cents wheel 57, causes the indexing of tens wheel 58 one-tenth of a turn at the end of each revolution of the cents wheel. By means of a similar mechanism, each revolution of tens wheel 58 is made to index dollars wheel 59 one-tenth of a turn. For a more detailed disclosure of these transfer mechanisms, as well as of the driving means for the cents wheel, reference may be had to the above-identified Patent No. 2,814,444.

Rigidly secured to dollars wheel 59 and rotating therewith is a drive gear 60. Gear 60 is in mesh with the teeth of a gear wheel 61 which is pinned to shaft 46. Thus, the counter dollars wheel 59 drives gear 61 and shaft 46, through gear 60. Shaft 46 drives, in turn, sun gear 38' pinned thereto, the planet gears 36' and 37' in mesh with gears 38' and 40' (these planet gears now operating merely as idler gears, since the pins 34' and 35' are now stationary, and are not rotating around the axis of shaft 46 as they did during a manual presetting operation), the internal or ring gear 40', and finally plate 41' and roller 45. The various gear ratios are such that plate 41' moves at the same speed as dollars wheel 59, and in the direction marked "Run" in FIG. 3, viz. counterclockwise.

Prior to the start of the dispensing operation, roller 45 has been manually set to an angular position corresponding to three dollars by the operation of control handle 6, in the manner previously described. This latter operation has also brought lever 22 into an operative position with respect to its roller 45, and has cammed lever 20 into an inoperative position with respect to its roller 42, as previously described.

Just as dollars wheel 59 moves to the three-dollar position, roller 45, in its intermittent rotation, reaches an angular position such as to move camming surface 23 of lever 22 downward. Since spring 53 is considerably stronger than spring 28, arm 17 and fulcrum pin 19 will remain stationary, and lever 22 will rotate clockwise about fulcrum pin 19. This will move pin 24, connecting member 25, and link 30 upward against the urging of spring 28, until link 30 opens the switch operated thereby. This opening of the switch allows the valve V (FIG. 10) in the gasoline conduit to close, stopping the dispensing of gasoline at the preset quantity of three dollars' worth. Thus, it may be seen that the moving of link 30 upwardly closes or trips the gasoline valve V and stops the dispensing of fluid at the desired preset quantity. Since plate 41' rotates at the same speed as dollars wheel 59, whose (intermittent) rotation is at the same speed as cents wheel 57, the tripping accuracy is high.

It may be noted that when lever 22 is rotated clockwise, lever 20 is also rotated clockwise by pin 24 about its own fulcrum pin 18, but this affects nothing, as it merely moves the camming surface 21 of lever 20 further away from its roller 42.

The three volume (for gallons) wheels of the counter 11 comprise a tenths wheel 62, a gallons wheel 63, and a tens wheel 64. As the dispensing of gasoline is started, tenths wheel 62 will rotate, being driven by suitable gearing from the meter through which is passed the gasoline dispensed. It will now be assumed that prior to the start of another dispensing operation the preselecting mechanism has been manually set at three gallons, by the operation of control handle 6. This manual setting moves roller 42 to an angular position corresponding to three gallons. In addition, it brings lever 20 into an operative position with respect to its roller 42, and cams lever 22 into an inoperative position with respect to its roller 45.

In principle, the tripping operation by the rotation of the volume wheels is the same as for the money wheels, with roller 42 and lever 20 doing the tripping in the case of the "gallons" preset. In another embodiment of this invention, the same type of drive could be used for the gallons plate and roller as for the dollars plate and roller. In the particular embodiment disclosed, since the desired money settings of from 1 to 9 dollars inclusive correspond to the numbers on the dollars wheel 59, a direct drive for dollars is possible. The desired gallon settings on the dial 7, however, are from 1 to 19 inclusive, this corresponding to the numbers on none of the volume wheels 62, 63, or 64. A different type of dispensing drive is therefore used for the gallons plate 41 and roller 42.

Transfer pinions, similar to those previously described in connection with the cost wheels, are utilized for the volume wheels, these pinions being driven by a type of Geneva movement for indexing the higher value volume wheels 63 and 64. Transfer pinion 65 operates to index gallons wheel 63 from tenths wheel 62, and transfer pinion 66 operates to index tens wheel 64 from gallons wheel 63. In the aforementioned Bliss patent, these transfer pinions are free on a shaft such as 67. However, in the present invention, pinion 65 is pinned to shaft 67, thus causing this shaft to rotate along with transfer pinion 65; the pinion 65, however, still performs its function of indexing gallons wheel 63.

While dispensing is in progress, the counter 11 is running, and wheel 62 rotates. Once each revolution, it picks up pinion 65 and rotates it one-quarter turn. This in turn rotates shaft 67 and a pinion 68 pinned to the end of this shaft. Pinion 68 drives a gear 69 which is secured to a wheel 70 mounted for rotation on an extension 71 of the volume wheel shaft of the counter 11. The gear ratio between pinion 68 and gear 69 is such that wheel 70 moves half as far per impulse (from pinion 65) as wheel 63. Therefore, since wheel 63 requires ten gallons for a full revolution, wheel 70 requires twenty gallons for a full revolution.

Wheel 70 is similar in construction to wheel 59, except that the number drum is omitted from wheel 70. Wheel 70 is utilized to drive the gallons plate 41 and gallons roller 42, and since wheel 70 requires twenty gallons for a full revolution, the gallon settings for the preselecting mechanism can be from 1 to 19 inclusive.

A drive gear 72 is rigidly secured to wheel 70, and rotates therewith. Gear 72 is in mesh with the teeth of a gear 73 which is pinned to shaft 39. Thus, the wheel 70 drives gear 73 and shaft 39, through gear 72. Shaft 39 drives, in turn, sun gear 38 pinned thereto, the planet gears 36 and 37 in mesh with gears 38 and 40 (these planet gears are now operating merely as idler gears, since the pins 34 and 35 are now stationary, and are not rotating around the axis of shaft 39 as they did during a manual presetting operation), the internal or ring gear 40, and finally plate 41 and roller 42. Plate 41 moves in the direction marked "Run" in FIG. 3, viz. counterclockwise.

The tripping action for a "Gallons" preset is similar to that already described for a "Dollars" preset. Assuming that roller 42 has been moved to an angular position corresponding to three gallons (lever 20 then being in an operative position and lever 22 in an inoperative position), just as wheel 70 moves to the position corresponding to three gallons, roller 42, in its intermittent rotation, reaches an angular position such as to move camming surface 21 of lever 20 clockwise. This moves pin 24, connecting member 25, and link 30 upwardly, closing the valve V in the gasoline conduit and stopping the dispensing of gasoline, at the preset quantity of three gallons.

Since plate 41 rotates at the same speed as the twenty gallons/revolution wheel 70 whose (intermittent) rotation is at half the speed of tenths wheel 62, the tripping accuracy is high.

When a "fill-up" gasoline dispensing operation is required, the dispensing should not stop at any preset value. This requires that the preselecting mechanism of this invention be disabled or rendered inoperative. What would be the zero setting of gallons and dollars on dial 7 is used for this purpose, this setting having a "Fill-Up" legend thereat. When dial 7 is set at "Fill-Up" by means of control handle 6, gear 31 and gear 43 are rotated until cam intersection 49 is adjacent lugs 50 and 51. This intersection serves as a raised camming portion in line with both lugs. Now, during the dispensing operation, springs 52 and 53 urge arms 16 and 17 upward as before, but in this case both lugs 50 and 51 are engaged by the camming portion 49, holding arms 16 and 17 and levers 20 and 22 upwardly, and holding both surfaces 21 and 23 in inoperative positions with respect to the respective rollers 42 and 45. Thus, as dispensing proceeds, the switch will not be tripped (since neither lever will be actuated) and the valve will not be closed by the preselecting mechanism, so dispensing must be stopped by a suitable operation at the nozzle.

At the end of a dispensing operation, the pump control handle 5 (see FIG. 10) is operated to turn the pump motor M off. The operation of this handle in this direction rotates a shaft 74 in the counter 11 for performing certain pre-reset operations, as disclosed in the above-mentioned patent. The operation of turning the pump off rotates shaft 74 approximately 90° counterclockwise (as viewed from FIG. 3).

Rigidly secured to shaft 74 and rotating therewith is a member 75 having a raised camming surface 76 and also having a hoodlike portion 77 which extends outwardly in a direction away from the counter side plate 10, and the ends of which subtend an angle of somewhat less than 90° at the center of shaft 74. Member 75 is positioned between base member 9 and counter side plate 10. The center of the hood 77 is displaced about 90° angularly from the center of cam 76. The pin 29, previously referred to, extends from a point in front of base member 9, through this member and into the space between base member 9 and counter side plate 10, in such a position as to ride on the dwell and rise portions of cam surface 76. Pin 29 extends into the space between hood 77 and the dwell portion of cam 76, in such a way that this hood limits the upward movement of pin 29 when this pin is riding on the dwell portion of the cam. However, when member 75 is rotated approximately 90° counterclockwise along with shaft 74, the rise portion of cam 76 engages pin 29 and causes it to move upwardly, the hood 77 then having rotated to such an angular position that it no longer restricts the upward movement of pin 29. A spring 78 having one end secured to pin 29 and its other end secured to a fixed point on the rear face of base member 9, urges pin 29 downwardly against the dwell and rise portions of cam 76, so that pin 29 is in essence a cam follower.

Pin 29 is fixed to a crank 79 which in turn is fixed to a pivot 80 rotatably mounted in base 9. Crank 79 has integral therewith a single tooth which is adapted to fit between two adjacent teeth of gear 31; the crank 79 with its single tooth may be thought of as being analogous to a pawl.

Outwardly from crank 79 and aligned with arms 16 and 17, respectively, pin 29 has two circumferential grooves in which the legs of the respective T-arms are adapted to fit. T-arm 16 is provided at the end of its leg with an elongated aperture or slot 81 in which pin 29 rides. T-arm 17 is provided at the end of its leg with a similar elongated aperture or slot in which pin 29 rides.

As stated, the operation of turning the pump off rotates shaft 74 approximately 90° counterclockwise. This rotation moves hood 77 out of the way of pin 29, and causes the rise portion of cam 76 to lift pin 29 against its spring 78. This produces a counterclockwise rotation of crank 79, lifting its tooth out of engagement with the teeth of gear 31. Gear 31 is now free to rotate, and may now be rotated by control handle 6, to bring about a change in the preset value, resulting in the rotation of rollers 42 and 45 by means of the mechanism previously described.

At the same time, the outer or front end of pin 29, as this pin is caused to rotate counterclockwise by the cam-and-crank arrangement 76, 79, engages the ends of the slots 81 in arms 6 and 7 and rotates these arms clockwise about the pivot pin 15, against the urging of springs 52 and 53. This rotation lifts the lugs 50 and 51 free of cam elements 47 and 48, and by moving the fulcrum pins 18 and 19 clockwise lifts the camming surfaces 21 and 23 of levers 20 and 22 free of the path of rotation of rollers 42 and 45.

Summarizing the above action, the turning off of the pump unlocks the gear train of the preselecting mechanism, thus allowing manual presetting to a different value by handle 6; it also allows this change in the preset value, and resetting of the counter to zero in a manner to be described, without interference between the rollers 42 and 45 and their respective camming surfaces 21 and 23.

As previously described, the link 30 is moved upwardly by levers 20 or 22 (depending on which one is in operative position for a particular preset dispensing operation) at the end of a preset dispensing operation, to effect a closing of the valve, thereby to stop the dispensing operation. When the pump is turned off thereafter, two actions occur, the combined effect of which is to move the link 30 back down in preparation for the next dispensing operation. Firstly, turning the pump off causes the pin 29 to rotate in a counterclockwise direction. This rotation produces a component of motion which pulls the lower end of spring 28 downwardly, thereby tending to pull link 30 downwardly also. In this connection, it will be remembered that the lower end of spring 28 is fastened to pin 29 and the upper end of this spring is secured to connecting member 25 and link 30. Secondly, at the end of a preset dispensing operation, one of the camming surfaces (21 or 23, whichever one was active or operative) will ordinarily be closely adjacent its respective roller. The moving of the fulcrum pins 18 and 19 clockwise (due to the rotation of arms 16 and 17 clockwise) moves whichever camming surface is operative at the time (say surface 21 on lever 20) into contact with its roller (say 42). The moving of the fulcrum pin (say 18) downwardly or clockwise causes a pivoting of (say) lever 20 about roller 42 acting as a fulcrum, causing pin 24 to be moved downwardly also. The moving of pin 24 downwardly moves connecting member 25 and link 30 downwardly, also. This last action may occur with whichever lever 20 or 22 has been in operative position for the particular dispensing operation under consideration.

As disclosed in the reference patent, the cost wheels 57, 58, and 59 are reset to zero, once the pump has been turned off, by a mechanism operated by reset handle 4 (see FIG. 1). This reset mechanism includes three gears 82 (only one of which is shown) on a shaft 83. When the reset handle 4 is operated after a dispensing operation, the wheels 57, 58, and 59 are caused to move by gears 82 in the reverse direction (that is, in the direction opposite to that in which they move during a dispensing operation) until they reach a zero position, as disclosed in detail in the reference patent. As wheel 59 resets to zero, the same gear train that moved roller 45 in the counterclockwise direction during the dispensing operation now resets it in the clockwise or "Reset" direction to the position illustrated in FIG. 3 (assuming that the preset mechanism has not been moved from the three-dollar position illustrated). More specifically, when dollars wheel 59 rotates in the reverse direction during resetting it drives gear 61 and shaft 46 in the reverse direction, through gear 60. Shaft 46 rotates sun gear 38' in the reverse direction, and through the planet gears 36' and 37' (again operating merely as idlers) the ring gear 40', plate 41', and roller 45 are all rotated in the reverse or "Reset" direction, that is, clockwise in FIG. 3. Roller 45 is now reset to the position shown in FIG. 3, after the dispensing operation.

It has previously been explained how presetting to a different dollar value is accomplished. The ring gear 40' will rotate from the rotation of sun gear 38' in the "Run" direction while dispensing or in the "Reset" direction during resetting, or will rotate from the revolution of the planet gears 36' and 37' during the presetting to a different value. Presetting to a different dollar value causes roller 45 to move around to a new position determined by the position of handle 6, as previously described. As long as the mechanism remains preset at this new value, the roller 45 will be in this new position when counter wheels are at zero, and will reset back to this same (new) position after each dispensing operation.

The volume wheels 62, 63, and 64 are reset to zero, once the pump has been turned off, by the same mechanism (including the same gears 82) which resets the cost wheels 57, 58, and 59. An extra reset gear 84 is mounted on an extension of shaft 83 (which mounts the regular reset gears 82), in a position such as to reset the wheel 70. The wheel 70 is caused to move in the reverse direction by gear 84 when the reset handle 4 is operated after a dispensing operation. As wheel 70 resets to its zero position, the same gear train that moved roller 42 in the counterclockwise direction during the dispensing operation now resets it in the clockwise or "Reset" direction. Specifically, when wheel 70 rotates in the reverse direction during resetting it drives gear 73 and shaft 39 in the reverse direction, through gear 72. Shaft 39 rotates sun gear 38 in the reverse direction, and through the planet gears 36 and 37 (now operating merely as idlers) the ring gear 40, plate 41, and roller 42 are all rotated in the reverse or "Reset" direction, which is clockwise in FIG. 3. Roller 42 is now reset to some position determined by the setting of control handle 6.

When presetting to a gallons value is accomplished, the roller 42 and the gear train which drives the same are considered. Presetting to a gallons value causes roller 42 to move around to a new position determined by the position of handle 6, as previously described. As long as the mechanism remains preset at this new (gallons) value, the roller 42 will be in this new position when the counter wheels are at zero, and will reset back to this same (new) position after each dispensing operation.

After the pump has been turned off and the counter wheels have been reset, the device is ready for a new dispensing operation, which latter may involve a change in the presetting. This change in the presetting is accomplished by rotation of control handle 6 as above described, the gears 31, 43, etc. being unlocked or free to rotate when the pump is turned off.

When the pump is turned on by means of handle 5 to start a new dispensing operation, shaft 74 is rotated approximately 90° clockwise, back to the position shown in the drawings. Pin 29 then rides down onto the dwell portion of cam 76, allowing this pin to be moved inwardly by spring 78. When this pin moves back inwardly, its crank 79 moves clockwise, causing the tooth thereon to re-engage a tooth space in gear 31, to lock the latter in place. Gear 31 has a number of teeth such that there is a tooth space corresponding to each dollar and gallon setting.

When crank 79 moves clockwise, the pin 29 moves out of engagement with the ends of the slots 81 in arms 16 and 17, freeing these arms for counterclockwise rotation about the pivot pin 15, in response to the urging of springs 52 and 53. Assuming that the preselecting mechanism is on the "Dollars" side of dial 7, arm 16 is stopped first by the contact of its lug 50 on cam surface 47, holding lever 20 in inoperative position with respect to the gallons roller 42. Arm 17 is then stopped by the contact of its fork 56 with stop 54, and lever 22 assumes its operative position with respect to the dollars roller 45. In this case, the operation of the switch controlling the valve, from the rotation of wheel 59, is as described above for a three-dollar preset, except that since roller 45 has now been preset to a new position, a different number of dollars on wheel 59 will be required to rotate the roller 45 to the trip position. In short, the number of dollars on wheel 59 required for tripping will correspond with the number on dial 7.

The hood 77 on member 75 serves to positively lock the preset mechanism when the pump is on, thus preventing inadvertent rotation of this mechanism to a new preset value while a dispensing operation is in progress. Although the tooth on crank 79 normally prevents rotation of wheel 31 while the pump is on, rotation of this wheel with considerable torque might tend to force this single tooth out of the intertooth space on gear 31. When the pump is on, the hood 77 is in the position shown in the drawings, and is in an overhanging position with respect to pin 29. Hood 77 then limits the upward movement of pin 29, and also the counterclockwise rotation of crank 79, to an amount insufficient for the tooth on this crank to become disengaged from gear 31.

It will be seen that the preselecting mechanism of this invention is rather simple in its mechanical construction. Likewise, the preselection itself is very simple, in that a single control handle 6 is used to select a desired or predetermined quantity of fluid to be dispensed, this quantity being expressed in either gallons or dollars as desired, and this same handle also selects a particular number of gallons, or dollars' worth, of gasoline to be dispensed. In addition, one particular position of this same control handle selects a "fill-up" operation, wherein the quantity of fluid to be dispensed is not predetermined.

The invention claimed is:

1. In a fluid dispensing apparatus, a rotatable actuating member, means for manually adjusting said member angularly to a setting corresponding to a desired quantity of fluid to be dispensed, a counter having one wheel driven through an angle proportional to the quantity of fluid dispensed; a mechanical coupling between said one wheel and said rotatable member operating to cause rotation of said member by said one wheel, said mechanical coupling operating to cause resetting of said rotatable member to its original, manually-adjusted angular setting when said counter is reset to zero, and means operating automatically in response to the reaching by said member of a predetermined angular position for stopping the dispensing of fluid from said apparatus.

2. In a fluid dispensing apparatus, a rotatable actuating member, means for manually adjusting said member angularly to a setting corresponding to a desired quantity of fluid to be dispensed, a valve the position of which controls the dispensing of fluid from said apparatus, the operation of said valve to a closed position stopping the dispensing of fluid from said apparatus, said valve being in its open position during the dispensing of fluid from said apparatus, a counter having one wheel driven through an angle proportional to the quantity of fluid dispensed; a mechanical coupling between said one wheel and said rotatable member operating to cause rotation of said member by said one wheel, said mechanical coupling operating to cause resetting of said rotatable member to its original, manually-adjusted angular setting when said counter is reset to zero, and means operating automatically in response to the reaching by said member of a predetermined angular position for operating said valve to a closed position.

3. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, means actuated by said manually operable means, in response to the operation thereof to turn on said pump, for locking said first-mentioned means against further manual operation, means for automatically rotating said member through an angle proportional to the quantity of fluid dispensed, and means operating in response to the reaching by said member, in its automatic rotation, of a predetermined angular position for closing said conduit.

4. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, means actuated by said manually operable means, in response to the operation thereof to turn on said pump, for locking said first-mentioned means against further manual operation, and actuated by said manually operable means, in response to the operation thereof to turn off said pump, for unlocking said first-mentioned means, thereby to permit free manual operation thereof, means for automatically rotating said member through an angle proportional to the quantity of fluid dispensed, and means operating in response to the reaching by said member, in its automatic rotation, of a predetermined angular position for closing said conduit.

5. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, a mechanical linkage between said last-mentioned means and said first-mentioned means, said linkage acting in response to the turning on of said pump to lock said first-mentioned means against further manual operation, means for automatically rotating said member through an angle proportional to the quantity of fluid dispensed, and means operating in response to the reaching by said member, in its automatic rotation, of a predetermined angular position for closing said conduit.

6. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, means for automatically rotating said member through an angle proportional to the quantity of fluid dispensed, a lever operated by said member to effect closing of said conduit in response to the reaching by said member, in its automatic rotation, of a predetermined angular position, and means actuated by said manually operable means, in response to the operation thereof to turn off said pump, for moving said lever to an inoperative position with respect to said member.

7. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, a counter having one wheel driven through an angle proportional to the quantity of fluid dispensed; a mechanical coupling between said one wheel and said rotatable member operating to cause rotation of said member by said one wheel, said mechanical coupling operating to cause resetting of said rotatable member to its original, manually-adjusted angular position when said counter is reset to zero, a lever operated by said member to effect closing of said conduit in response to the reaching by said member of a predetermined angular position, and means actuated by said manually operable means, in response to the operation thereof to turn off said pump, for moving said lever to an inoperative position with respect to said member, thereby to permit unobstructed resetting of said member when said counter is reset to zero.

8. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, means for automatically rotating said member through an angle proportional to the quantity of fluid dispensed, a lever operated by said member to effect closing of said conduit in response to the reaching by said member, in its automatic rotation, of a predetermined angular position, and a mechanical linkage between said manually operable means, on the one hand, and said first-mentioned means and said lever, on the other hand, said linkage acting in response to the turning on of said pump to lock said first-mentioned means against further manual operation and acting in response to the turning off of said pump to unlock said first-mentioned means, thereby to permit free manual operation thereof, and to move said lever to an inoperative position with respect to said member.

9. In a fluid dispensing apparatus, a rotatable actuating member, means for manually adjusting said member angularly to a position corresponding to a predetermined quantity of fluid to be dispensed, a pump for pumping fluid from a reservoir through a conduit, manually operable means for turning said pump on and off, a counter having one wheel driven through an angle proportional to the quantity of fluid dispensed; a mechanical coupling between said one wheel and said rotatable member operating to cause rotation of said member by said one wheel, said mechanical coupling operating to cause resetting of said rotatable member to its original, manually-adjusted angular position when said counter is reset to zero, a lever operated by said member to effect closing of said conduit in response to the reaching by said member of a predetermined angular position, and a mechanical linkage between said manually operable means, on the one hand, and said first-mentioned means and said lever, on the other hand, said linkage acting in response to the turning on of said pump to lock said first-mentioned means against further manual operation and acting in response to the turning off of said pump to unlock said first-mentioned means, thereby to permit free manual operation thereof, and to move said lever to an inoperative position with respect to said member, thereby to permit unobstructed resetting of said member when said counter is reset to zero.

10. In a fluid dispensing apparatus, first and second rotatable actuating members, a first actuatable member arranged for actuation by said first rotatable member, a second actuatable member arranged for actuation by said second rotatable member, means operated by a single control handle for simultaneously manually adjusting both of said rotatable members angularly to a setting responsive to the position of said handle and corresponding to a desired volume or cost of fluid to be dispensed, means also operated by said handle and responsive to the position thereof for selectively placing either said first or said second actuatable member in operative relation with its corresponding rotatable member according to whether volume or cost has been selected by the positioning of said handle, means for automatically rotating said first rotatable member through an angle proportional to the volume of fluid dispensed, means for automatically rotating said second rotatable member through an angle proportional to the cost of the fluid dispensed, and means operated automatically by the operative one of said actuatable members, in response to the reaching by its corresponding rotatable member of a predetermined angular position, for stopping the dispensing of fluid from said apparatus.

11. In a fluid dispensing apparatus, first and second rotatable actuating members, a first actuatable member arranged for actuation by said first rotatable member, a second actuatable member arranged for actuation by said second rotatable member, means operated by a single control handle for simultaneously manually adjusting both of said rotatable members angularly to a setting responsive to the position of said handle and corresponding to a desired volume or cost of fluid to be dispensed, means also operated by said handle and responsive to the position thereof for selectively placing either said first or said second actuatable member in operative relation with its corresponding rotatable member according to whether volume or cost has been selected by the positioning of said handle, a counter having a first wheel driven through an angle proportional to the volume of fluid dispensed and having a second wheel driven through an angle proportional to the cost of the fluid dispensed; a mechanical coupling between said first wheel and said first rotatable member for rotation of said first rotatable member by said first wheel, a mechanical coupling between said second wheel and said second rotatable member for rotation of said second rotatable member by said second wheel, and means operated automatically by the operative one of said actuatable members, in response to the reaching by its corresponding rotatable member of a predetermined angular position, for stopping the dispensing of fluid from said apparatus.

12. In a fluid dispensing apparatus, a rotatable actuating member, an arm mounted for pivotal movement with respect to a fixed point, a fulcrum pin fastened on said arm to move therewith, a lever mounted on said pin in such a way that said pin can serve as a fulcrum point for said lever, one end of said lever being positioned for movement into and out of operative relationship with said member, means coupling the other end of said lever to a valve-controlling mechanism, means operated by a control handle for manually adjusting said member angularly to a setting responsive to the position of said handle and corresponding to a predetermined quantity of fluid to be dispensed, a camming surface adapted to be rotated by said handle and extending over substantially 180° of the rotation thereof, said camming surface engaging said arm over said 180° of rotation, thereby to move said arm and said fulcrum pin, and thereby also said lever, in a direction such as to move said lever out of operative relationship with said member, and means for automatically rotating said member through an angle proportional to the volume of fluid dispensed, said lever when in operative relationship with said rotatable member functioning to operate said valve-controlling mechanism in response to the reaching by said member of a predetermined angular position.

13. In a fluid dispensing apparatus, first and second rotatable actuating members, a first arm mounted for pivotal movement with respect to a fixed point, a first fulcrum pin fastened on said arm to move therewith, a first lever mounted on said pin in such a way that said pin can serve as a fulcrum point for said lever, one end of said lever being positioned for movement into and out of operative relationship with said first member, a second arm mounted for pivotal movement with respect to said fixed point, a second fulcrum pin fastened on said second arm to move therewith, a second lever mounted on said second pin in such a way that said second pin can serve as a fulcrum point for said second lever, one end of said second lever being positioned for movement into and out of operative relationship with said second member, means coupling the other ends of both said first and second levers to a valve-controlling mechanism, means operated by a control handle for simultaneously manually adjusting both of said members angularly to a setting responsive to the position of said handle and corresponding to a desired volume or cost of fluid to be dispensed, a first camming surface adapted to be rotated by said handle and extending over substantially 180° of the rotation thereof representing a cost selection, said camming surface engaging said first arm over said 180° of rotation, thereby to move said first arm and said first fulcrum pin, and thereby also said first lever, in a direction such as to move said first lever out of operative relationship with said first member, a second camming surface adapted to be rotated by said handle and extending over substantially the remaining 180° of the rotation thereof representing a volume selection, said second surface engaging said second arm over said remaining 180° of rotation, thereby to move said second arm and said second fulcrum pin, and thereby also said second lever, in a direction such as to move said second lever out of operative relationship with said second member, means for automatically rotating said first member through an angle proportional to the volume of fluid dispensed, and means for automatically rotating said second member through an angle proportional to the cost of the fluid dispensed, the operative one of said levers functioning to operate said valve-controlling mechanism in response to the reaching by its corresponding member of a predetermined angular position.

14. In a fluid dispensing apparatus, a rotatable actuating member, means for manually adjusting said member angularly to a setting corresponding to a desired quantity of fluid to be dispensed, means for automatically rotating said member through an angle proportional to the quantity of fluid dispensed, both of said means together including an epicyclic gear train for producing rotation of said member; and means operating in response to the reaching by said member, in its automatic rotation, of a predetermined angular position for stopping the dispensing of fluid from said apparatus.

15. In a fluid dispensing apparatus, a first sun gear, means for automatically rotating said gear through an angle proportional to the cost of the fluid dispensed, a first set of planet gears rotatable about said sun gear and having their teeth in mesh with those of said sun gear, a first internal-toothed gear having its teeth in mesh with those of said planet gears, a first actuating member carried by said last-mentioned gear, a second sun gear, means for automatically rotating said second sun gear through an angle proportional to the volume of fluid dispensed, a second set of planet gears rotatable about said second sun gear and having their teeth in mesh with those of said second sun gear, manually-operated means for causing rotation of both said first and said second planet gears through a predetermined angle about their respective sun gears, a second internal-toothed gear having its teeth in mesh with those of said second planet gears, a second actuating member carried by said last-mentioned gear, and means operating in response to the reaching by a preselected one of said actuating members, in its automatic rotation, of a predetermined angular position for stopping the dispensing of fluid from said apparatus.

16. Apparatus as defined in claim 15, wherein the preselecting of one of said actuating members is effected by the operation of said manually-operated means.

17. In a fluid dispensing apparatus, first and second rotatable actuating members, a first actuatable member arranged for actuation by said first rotatable member, a second actuatable member arranged for actuation by said second rotatable member, a first sun gear, means for automatically rotating said gear through an angle proportional to the cost of the fluid dispensed, a first set of planet gears rotatable about said sun gear and having their teeth in mesh with those of said sun gear, a first internal-toothed gear having its teeth in mesh with those of said planet gears, said first rotatable member being secured to said last-mentioned gear, a second sun gear, means for automatically rotating said second sun gear through an angle proportional to the volume of fluid dispensed, a second set of planet gears rotatable about said second sun gear and having their teeth in mesh with those of said second sun gear, a second internal-toothed gear having its teeth in mesh with those of said second planet gears, said second rotatable member being secured to said last-mentioned gear, means operated by a single control handle for rotating both said first and said second planet gears through a predetermined angle, responsive to the position of said handle, about their respective sun gears, means also operated by said handle and responsive to the position thereof for selectively placing either said first or said second actuatable member in operative relation with its corresponding rotatable member according to whether volume or cost has been selected by the positioning of said handle, and means operated by the operative one of said actuatable members, in response to the reaching by its corresponding rotatable member of a predetermined angular position, for stopping the dispensing of fluid from said apparatus.

References Cited in the file of this patent
UNITED STATES PATENTS

| | | |
|---|---|---|
| 2,058,138 | De Lancey | Oct. 20, 1936 |
| 2,084,844 | Harris | June 22, 1937 |
| 2,139,216 | Wydler | Dec. 6, 1938 |
| 2,714,050 | Germann | July 26, 1955 |
| 2,814,444 | Bliss | Nov. 26, 1957 |